United States Patent [19]
Harrison

[11] 4,064,758
[45] Dec. 27, 1977

[54] PRESSURE TRANSDUCER STRUCTURE
[75] Inventor: Arthur Michael Harrison, Los Angeles, Calif.
[73] Assignee: Micron Instruments, Los Angeles, Calif.
[21] Appl. No.: 731,546
[22] Filed: Oct. 13, 1976
[51] Int. Cl.² ............................................. G01L 9/06
[52] U.S. Cl. .................................. 73/398 AR; 73/406; 338/4; 338/42
[58] Field of Search .......... 73/398 AR, 406, 88.5 SD, 73/420; 338/4, 42, 41; 174/117 FF

[56] References Cited
U.S. PATENT DOCUMENTS

| | | | |
|---|---|---|---|
| 3,520,191 | 7/1970 | Pien | 73/398 AR |
| 3,568,124 | 3/1971 | Sonderegger | 73/398 AR |

Primary Examiner—Donald O. Woodiel
Attorney, Agent, or Firm—Spensley, Horn & Lubitz

[57] ABSTRACT

A pressure transducer structure for a pressure transducer of the type comprising a hollow transducer housing, a thin diaphragm provided in one end of the housing, a plurality of semiconductor strain gauges provided on the inside surface of the diaphragm and an intermediate tie point. The intermediate tie point comprises a small curved flexible nonconductive board which is bonded at both ends to the inside surface of the transducer housing in close proximity to the diaphragm. The intermediate tie point further contains a plurality of conductors for electrically coupling very fine wires from the semiconductors at one end and the conductors of a connecting cable at the other end.

7 Claims, 4 Drawing Figures

U.S. Patent   Dec. 27, 1977   4,064,758
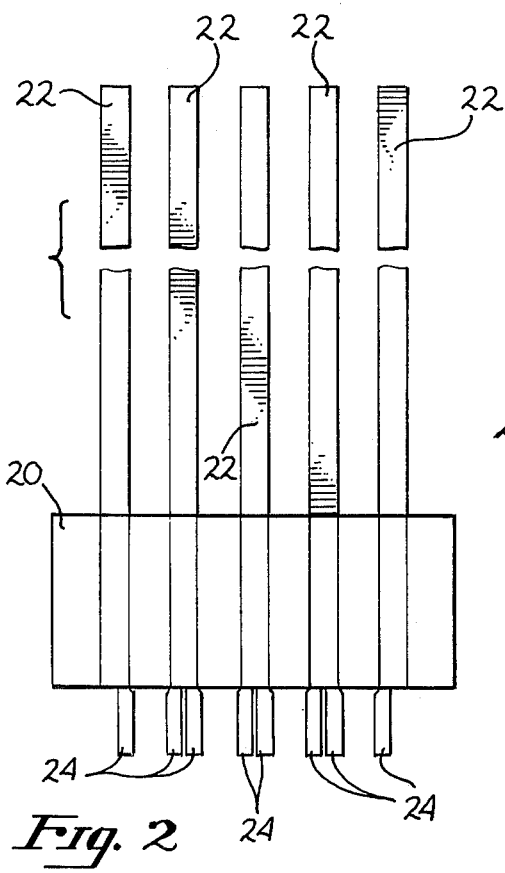
Fig. 1
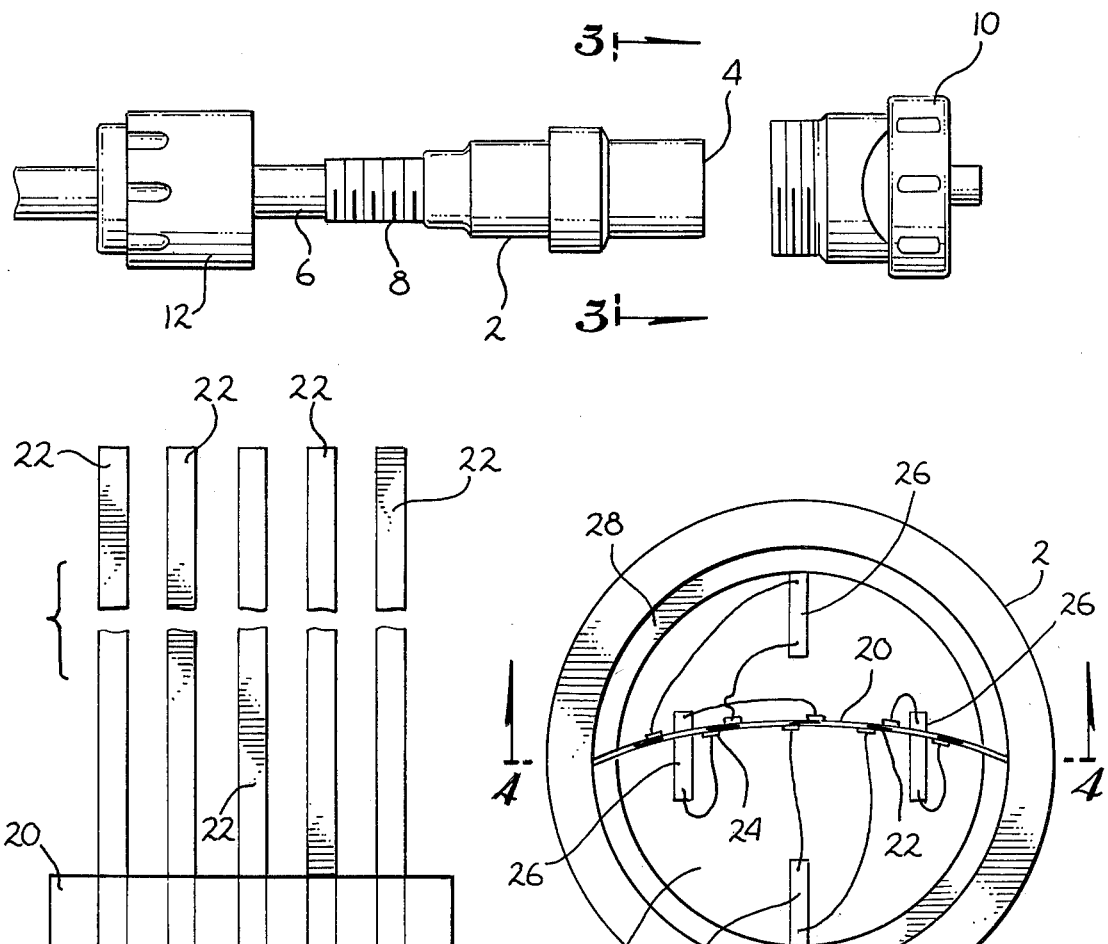
Fig. 2
Fig. 3
Fig. 4

PRESSURE TRANSDUCER STRUCTURE

FIELD OF INVENTION

This invention relates to pressure transducers and more particularly to pressure transducers which utilize semiconductor strain gauges to measure microstrain.

BACKGROUND OF THE INVENTION

In the prior art, there exists several structures for pressure transducers. In particular, in the prior art which relates to pressure transducers which measure microstrain of a diaphragm, there exists several structures each with their own problems. The first such structure was the unbonded strain gauge-type pressure transducer. This type of pressure transducer utilizes very fine wires together with sapphire rods arranged in a machined housing having various tie points and curved portions. Such a pressure transducer is very complex to manufacture and is exceedingly fragile.

A second type of pressure transducer involves the so-called bonded strain gauge-type utilizing very small semiconductor or foil strain gauges. Since the strain gauges are exceedingly small and the attachment wires on the strain gauges are even smaller and are typically made from a soft metal such as gold, a means must be provided within the pressure transducer housing so that the exceedingly fine wires from the strain gauges can be connected to the output cable of the pressure transducer. Such means have included solder tabs bonded to the inside of the pressure transducer housing and a miniature rigid circuit board provided within the transducer housing and bonded about its periphery to the inside surface of the transducer housing with epoxy or the like. Such structures as the solder tabs or the rigid circuit boards have a problem in that there exists induced microstrain inherent in their own structure. In particular, the epoxy used to bond either the solder tabs or the circuit board to the inside surface of the transducer housing has a different coefficient of expansion than the material that the housing is made from. Since the epoxy has a different temperature coefficient of expansion than the material of the housing and since such structures typically require a relatively large amount of epoxy to bond either the solder tabs or the rigid circuit board, the epoxy expands at a different rate than the housing thereby inducing microstrain into the structure and affecting the accuracy of the pressure transducer. Furthermore, since the miniature rigid circuit board is usually coupled directly to the output cable of the pressure transducer, strains applied to the cable are also transmitted via the rigid circuit board to the structure thereby also affecting the accuracy of the reading of the pressure transducer.

Accordingly, it is a general object of the present invention to provide a structure for a very small pressure transducer which is relatively insensitive to problems created by the thermal coefficient of expansion of the various materials utilized in the transducer, stresses created by the means for mounting the pressure transducer, the extreme stresses that may be encountered during handling and use of the transducer and the extremely small physical dimensions.

It is yet another object of the present invention to provide a structure for a pressure transducer which allows the pressure transducer to be easily manufactured using acceptable production techniques.

SUMMARY OF THE INVENTION

In keeping with the principles of the present invention, the objects are accomplished with a unique pressure transducer structure for a pressure transducer of the type comprising a hollow transducer housing, a thin diaphragm provided in one end of the transducer housing, a plurality of semiconductor strain gauges provided on the inside surface of the diaphragm and an intermediate tie point. The intermediate tie point comprises a small curved, flexible, nonconductive board which is bonded at both ends to the inside of the transducer housing in close proximity to the diaphragm by a small amount of epoxy. The intermediate tie point further contains a plurality of conductors for electrically coupling the very fine wires from the semiconductors at one end and the conductors of a connecting cable at the other end.

BRIEF DESCRIPTION OF THE DRAWINGS

The above mentioned and other features and objects of the present invention will become more apparent by reference to the following description taken in conjunction with the accompanying drawings, wherein like referenced numerals denote like elements, and in which:

FIG. 1 is an exploded plan view of a pressure transducer in accordance with the teachings of the present invention;

FIG. 2 is a side plan view of a intermediate tie point in accordance with the teachings of the present invention;

FIG. 3 is a cross-sectional view of the pressure transducer of FIG. 1 looking along the lines 3—3; and FIG. 4 is a cross-sectional view of a portion of the transducer of FIG. 3 looking along the lines 4—4.

DESCRIPTION OF THE PREFERRED EMBODIMENT

Referring more specifically to the drawings, shown in FIG. 1 is an exploded external view of a pressure transducer wherein the structure of the present invention may be utilized. Briefly, the pressure transducer of FIG. 1 includes a hollow transducer housing 2 of generally elongate shape. Provided in one end of the hollow transducer housing 2 is a thin diaphragm 4. A connector cable 6 enters the other end of the hollow transducer housing 2 and is supported by a stress releiving spring 8. The pressure transducer itself during use is enclosed within a pressure dome 10 which threads into a fitting 12.

In practice, the transducer housing 2 may be made from any material which is compatable with the environment in which the transducer is utilized, i.e., stainless steel, titanium, etc. In addition, the pressure dome may be made from a transparent high impact plastic such as polycarbonate. Furthermore, typically the transducer housing 2 is in the order of one-fourth of an inch in diameter and the total length of the transducer housing 2 is less than 1 inch.

Referring to FIGS. 2, 3 and 4, shown therein is the transducer structure in accordance with the teachings of the present invention. In FIG. 2, is shown the intermediate tie point which is the novel feature of the transducer structure of the present invention. Shown in FIGS. 3 and 4 is the installation of the intermediate tie point of FIG. 2 inside the pressure transducer housing 2.

Referring particularly to FIG. 2, the intermediate tie point before installation in the transducer housing 2 comprises a small thin flexible nonconductive board 20. The length of the board 20 is selected such that it is slightly larger than the inside diameter of the transducer housing 2. The flexible nonconductive board 20 is further provided with a plurality of conductors 22 extending transversely through the board 20. The ends of the conductors 22 as they project through the board 20 provide the required contact points 24.

Typically, the flexible board is made from a strong, flexible dielectric material of appropriate thickness. Furthermore, the conductors 22 may be made from an appropriate conductive material. Accordingly, it should be apparent that the structure which is the subject of the present invention is very small and presents several problems as a result of just its physical dimensions.

Referring to FIGS. 3 and 4, shown therein is the interior of the pressure transducer of FIG. 1 with the intermediate tie point of FIG. 2 installed.

In FIGS. 3 and 4, strain gauges 26 are provided on the inside surface of the diaphragm 4. As shown in FIG. 4, the inside of housing 2 adjacent diaphragm 4 is provided with a shoulder 28. The intermediate tie point is then inserted into the interior of the housing 2 and rests on the shoulder 28 adjacent diaphragm 4. Since the board 20 of the intermediate tie point is flexible and slightly larger than the diameter of the inside of the housing 2, the board takes on a slight curvature as shown in FIG. 3. The ends of the board 20 of the intermediate tie point are then bonded to the inside surface of the housing 2 with a small amount of epoxy or the like. The fine wires from the strain gauges 26 are then coupled to the appropriate contact points 24. The other end of the conductors 22 is coupled to the wires contained in the multiwire cable 6.

In practice, the intermediate tie point may be inserted into the interior of the transducer housing 2 using simply a pair of tweezers to slightly bend the board 20 as it is inserted. Furthermore, the strain gauges 26 are typically connected in a bridge network. In addition, the strain gauges 26 may be any strain gauge so long as it is of the correct physical dimensions and supplies sufficient output, such as a semiconductor strain gauge. Also, the strain gauges 26 are typically only a few hundredths of an inch in length and the leads from the strain gauges 25 are made from gold and are of a diameter of approximately 0.001 inches. Again, it is apparent that the physical dimensions are very small and present particular problems of their own which are overcome by the present invention.

As previously stated, it is the intermediate tie point which is the novelty of the within invention. In particular, it is the curved shape that the board 20 of the intermediate tie point assumes which provides the particular advantages of the present invention. As a result of the curve of the board 20, induced strains which might be caused as a result of different coefficients of expansion of the board 20 and the housing 2 are eliminated since as the housing grows larger, the board can straighten out slightly and vice versa. Furthermore, the board does not transmit strain to the semiconductor strain gauges 26. In addition, the intermediate tie point lends itself to use in a transducer in which the physical dimensions are very small and allows for convenient assembly of the transducer. Furthermore, since the intermediate tie point can be so easily inserted into the interior of the pressure transducer housing 2 without the aid of special tools or other special manufacturing aids, it lends itself to acceptable manufacturing techniques and allows the transducer to be assembled quicker and cheaper than any of the prior art structures.

In addition, it should be apparent to one skilled in the art that the curved flexible board 20 may be mounted within the housing by other means than by bonding. Such other means may include grooves and slots together with a retaining ring or the like.

In all cases it is understood that the above described embodiment is merely illustrative of but one of the many possible specific embodiments which can represent applications of the principles of the present invention. Numerous and varied other arrangements can be readily devised by those skilled in the art without departing from the spirit and scope of the invention.

I claim:

1. A pressure transducer structure for a pressure transducer of the type comprising a hollow transducer housing, a diaphragm provided in one end of said housing, a plurality of strain sensors provided in said housing and a connecting cable, the improvement comprising:

a bowed, flexible elongated non-conductive board having two ends provided in said housing adjacent said strain sensors and engaging the inside surface of said housing at both ends of said board; and a plurality of conductors provided in said board for electrically coupling said strain sensors at one end of said conductors and said cable at the other end of said conductors.

2. A pressure transducer structure according to claim 1 wherein said bowed flexible nonconductive board is bonded to the inside surface of said housing at both said ends of said board.

3. A pressure transducer structure according to claim 2 wherein said bowed flexible nonconductive board is bonded to the inside surface of said housing at both said ends of said board with a small amount of epoxy.

4. A pressure transducer structure for a pressure transducer according to claim 1 wherein said board is made from a strong flexible dielectric material.

5. A pressure transducer structure for a pressure transducer of the type comprising a hollow transducer housing, a thin diaphragm provided in one end of said housing, a plurality of semiconductor strain gauges provided on the inside surface of said diaphragm and a connecting cable, the improvement comprising:

a bowed, flexible elongated non-conductive board having two ends provided in said housing adjacent said strain gauges and engaging with and bonded to the inside surface of said housing at both ends of said board; and a plurality of conductors extending transversely in said board for electrically coupling said strain guages at one end of said conductors and said cable at the other end of said conductors.

6. A pressure transducer structure for a pressure transducer according to claim 5 wherein said bowed flexible nonconductive board is made from a strong flexible dielectric material.

7. A pressure transducer structure for a pressure transducer according to claim 5 wherein said bowed flexible nonconductive board is bonded to the inside surface of said housing with epoxy.

* * * * *